US009403503B2

(12) United States Patent
Buchholz et al.

(10) Patent No.: US 9,403,503 B2
(45) Date of Patent: Aug. 2, 2016

(54) GAS BAG ARRANGEMENT WITH A DEVICE FOR CONTROLLING AN OUTLET CROSS-SECTION OF A VENT OPENING

(71) Applicant: TAKATA AG, Aschaffenburg (DE)

(72) Inventors: Andre Buchholz, Berlin (DE); Mario Wendt, Stahnsdorf (DE); Johannes Pfeiffer, Berlin (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/651,566

(22) PCT Filed: Dec. 12, 2013

(86) PCT No.: PCT/EP2013/076400
§ 371 (c)(1),
(2) Date: Jun. 11, 2015

(87) PCT Pub. No.: WO2014/090951
PCT Pub. Date: Jun. 19, 2014

(65) Prior Publication Data
US 2015/0329073 A1 Nov. 19, 2015

(30) Foreign Application Priority Data

Dec. 13, 2012 (DE) .......................... 10 2012 223 078
Feb. 13, 2013 (DE) .......................... 10 2013 202 314
Apr. 26, 2013 (DE) .......................... 10 2013 207 696
May 16, 2013 (DE) .......................... 10 2013 209 135

(51) Int. Cl.
*B60R 21/239* (2006.01)

(52) U.S. Cl.
CPC ....... *B60R 21/239* (2013.01); *B60R 2021/2395* (2013.01)

(58) Field of Classification Search
CPC ...................... B60R 21/239; B60R 2021/2395
See application file for complete search history.

(56) References Cited

U.S. PATENT DOCUMENTS

| 8,608,197 | B2 * | 12/2013 | Eckert | .................. B60R 21/239 280/728.2 |
| 9,073,513 | B2 * | 7/2015 | Kalliske | .................. B60R 21/36 |
| 2007/0040366 | A1 | 2/2007 | Maidel et al. | |
| 2015/0239424 | A1 * | 8/2015 | Nebel | ................. B60R 21/2338 280/729 |
| 2015/0314747 | A1 * | 11/2015 | Weber | .................. B60R 21/239 280/728.3 |

FOREIGN PATENT DOCUMENTS

WO    WO-2011/157631 A1    12/2011

OTHER PUBLICATIONS

International Search Report dated Feb. 24, 2014 issued in PCT/EP2013/076400.

* cited by examiner

*Primary Examiner* — Ruth Ilan
(74) *Attorney, Agent, or Firm* — Gordon & Rees LLP

(57) ABSTRACT

A gas bag arrangement for a vehicle occupant restraint system is provided. The gas bag arrangement comprises a gas bag inflatable by a gas generator to protect a vehicle occupant, whose envelope defines an interior space of the gas bag that can be filled with gas, a vent opening through which gas can flow out of the gas bag, and a device for controlling the outlet cross-section of the vent opening, which comprises at least one covering part with which the vent opening can be covered, in order to at least partly close the same, and which furthermore comprises an actuating mechanism which interacts with the covering part, in order to vary the outlet cross-section of the vent opening. The actuating mechanism includes an additional gas source and an element different from the gas bag and inflatable by means of the gas source.

16 Claims, 13 Drawing Sheets

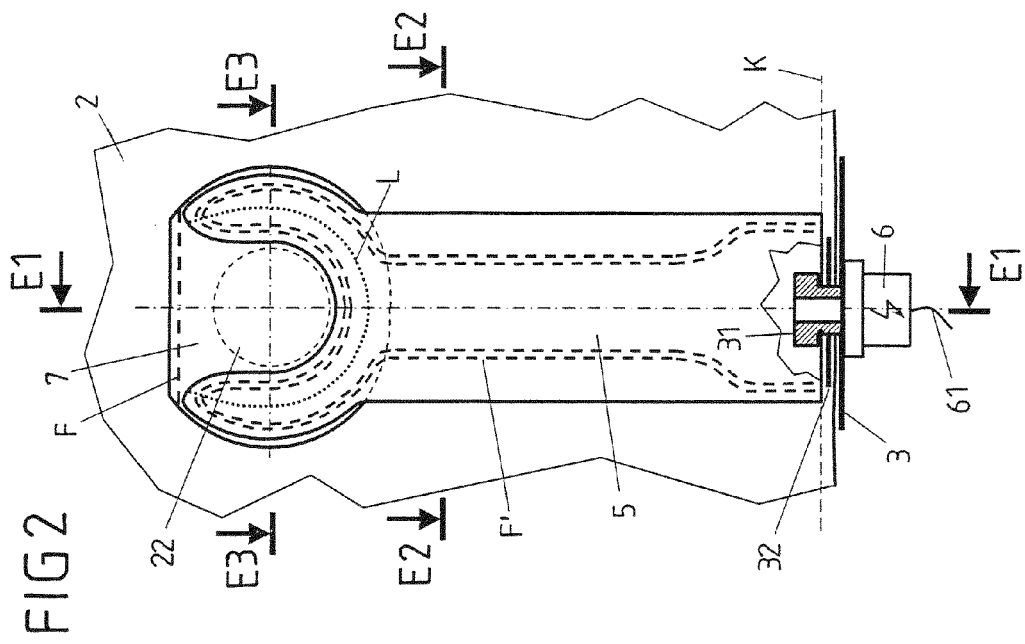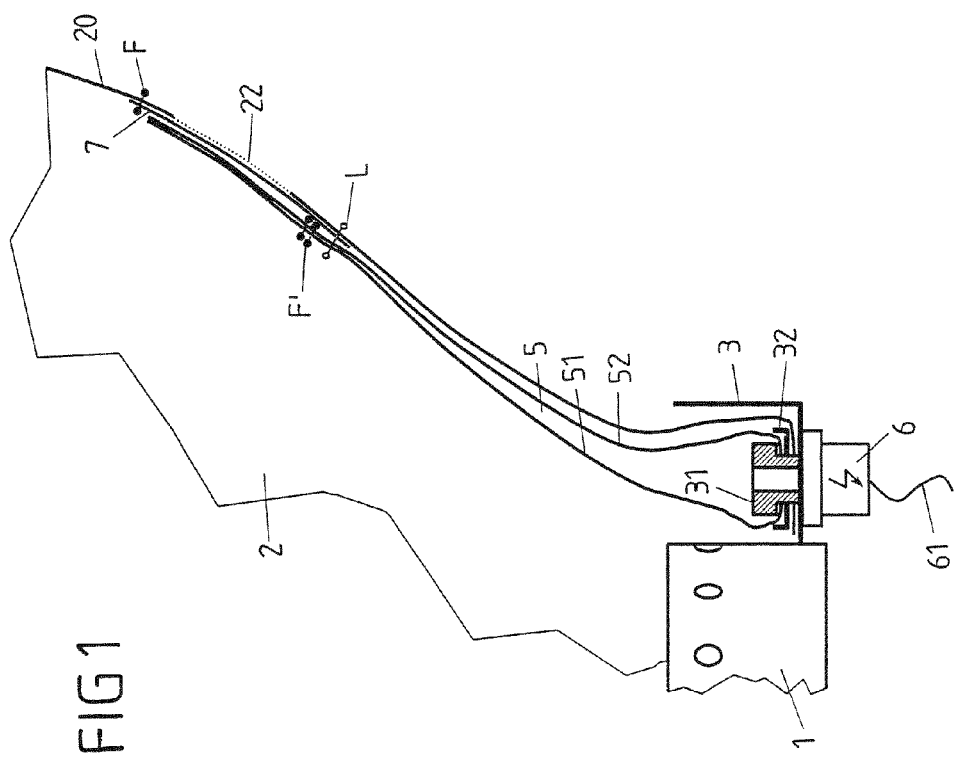

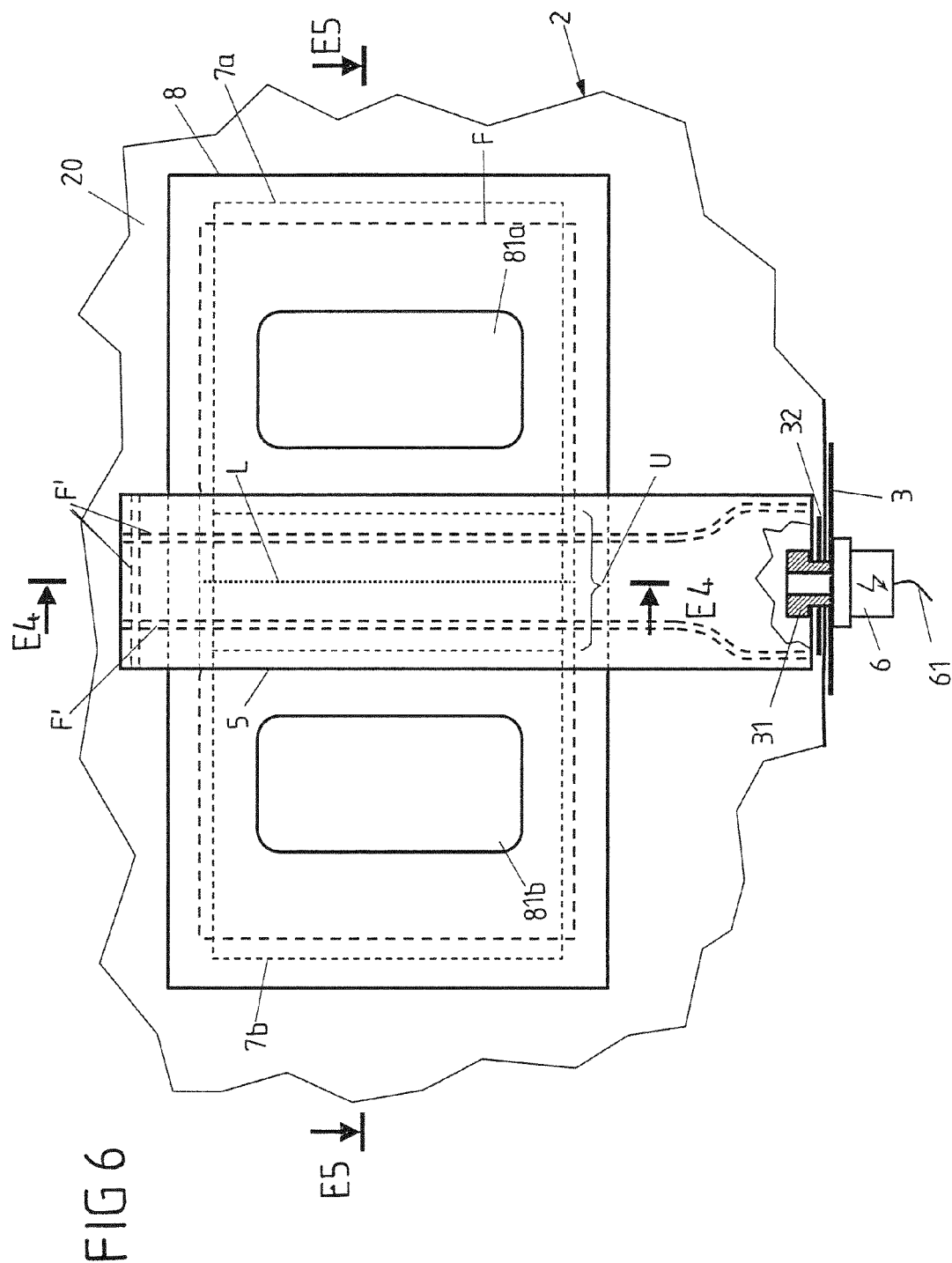

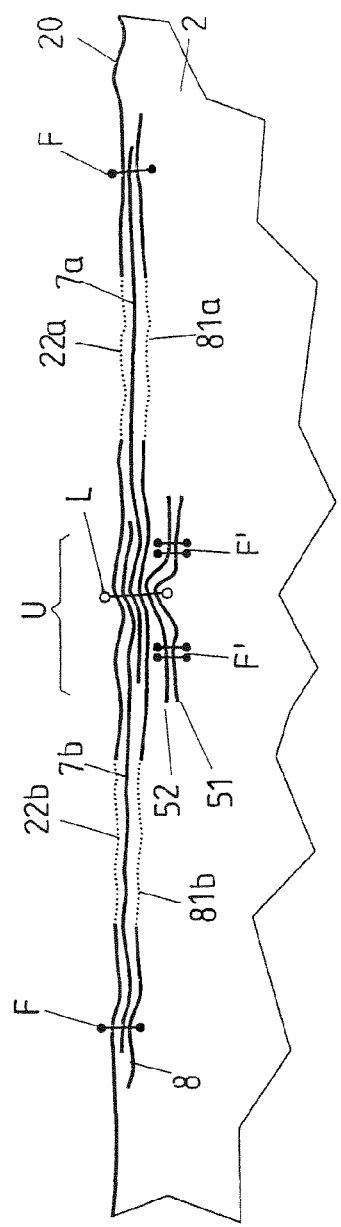
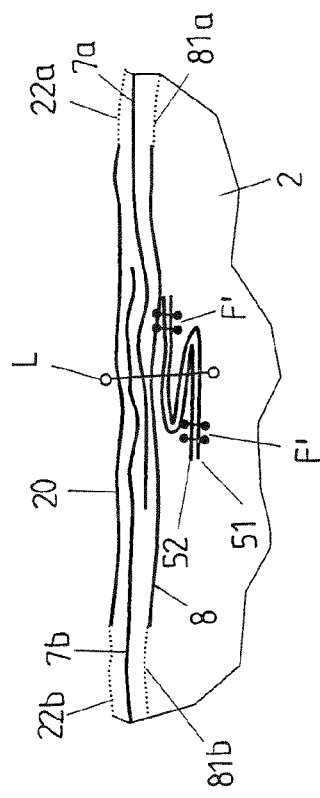
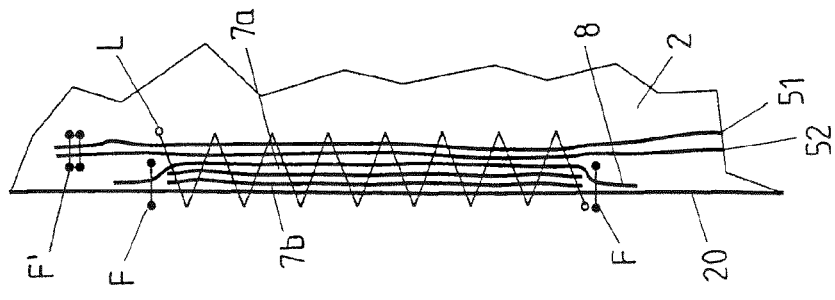

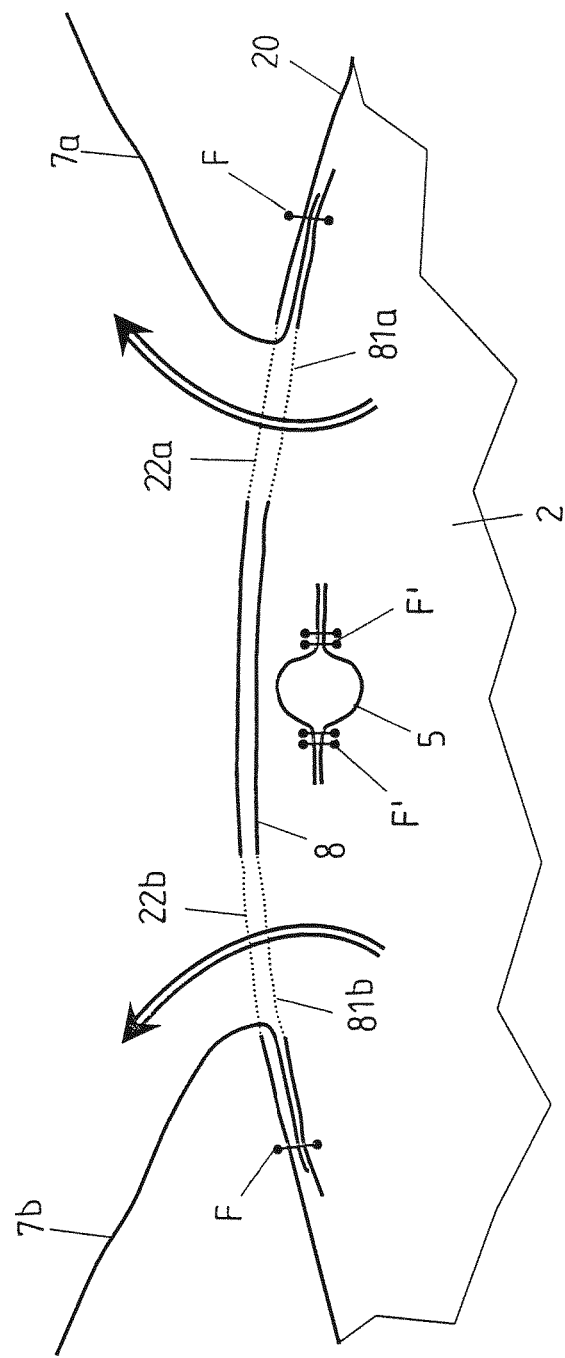

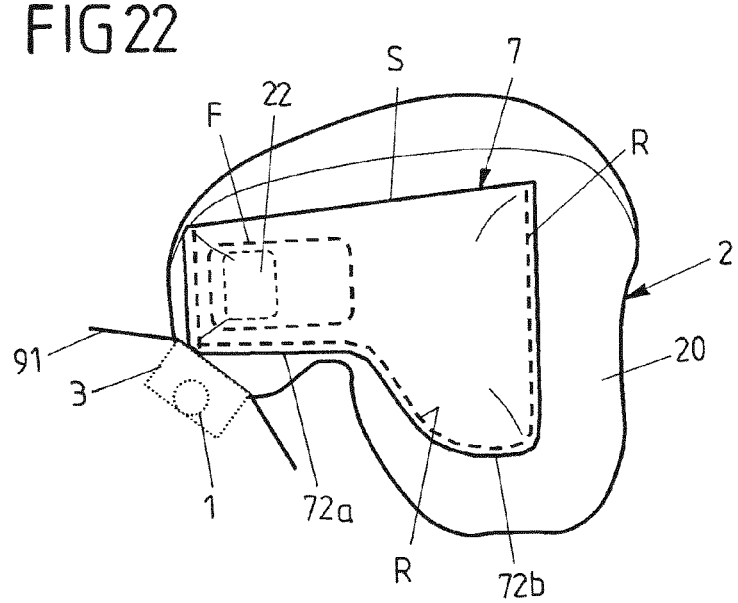
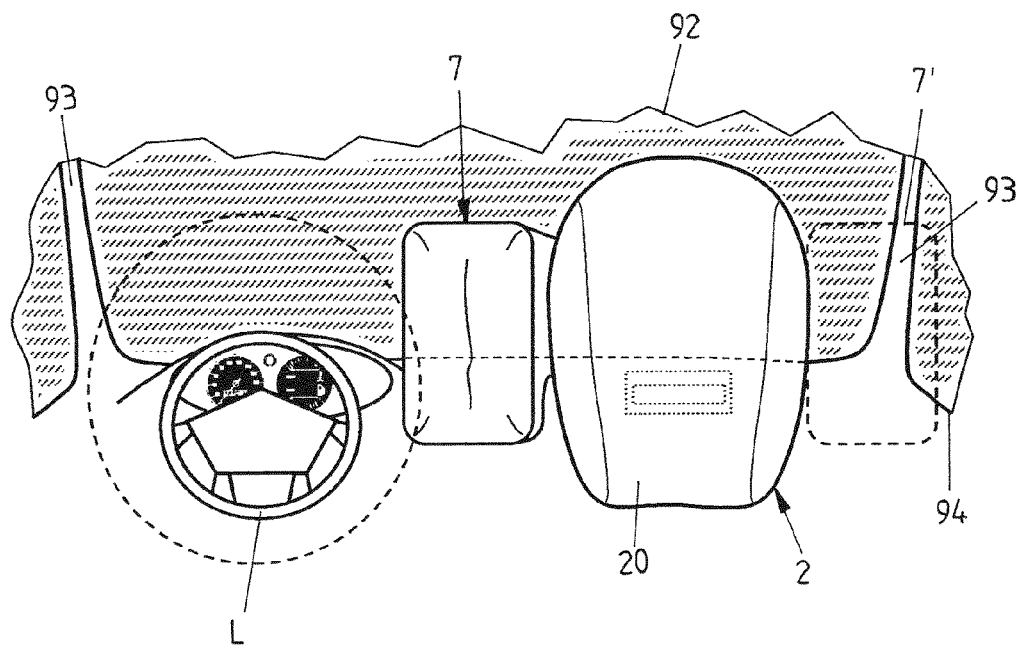

GAS BAG ARRANGEMENT WITH A DEVICE FOR CONTROLLING AN OUTLET CROSS-SECTION OF A VENT OPENING

CROSS-REFERENCE TO A RELATED APPLICATION

This application is a National Phase Patent Application of International Patent Application Number PCT/EP2013/076400, filed on Dec. 12, 2013, which claims priority of German Patent Application Number 10 2012 223 078.5, filed on Dec. 13, 2012, of German Patent Application Number 10 2013 202 314.6, filed on Feb. 13, 2013, of German Patent Application Number 10 2013 207 696.7, filed on Apr. 26, 2013 and of German Patent Application Number 10 2013 209 135.4, filed on May 16, 2013.

BACKGROUND

The invention relates to a gas bag arrangement for a vehicle occupant restraint system, with a gas bag inflatable by a gas generator to protect a vehicle occupant, whose envelope defines an interior space of the gas bag that can be filled with gas, with a vent opening through which gas can flow out of the gas bag, and with a device for controlling the outlet cross-section of the vent opening, which comprises at least one covering part with which the vent opening can be covered, in order to at least partly close the same, and which furthermore comprises an actuating mechanism which interacts with the covering part, in order to vary the outlet cross-section of the vent opening, wherein the actuating mechanism includes an additional gas source (different from the gas generator) and an element different from the gas bag and inflatable by means of the gas source, which during inflation interacts with the covering part such that it effects a change in the outlet cross-section of the vent opening.

Such gas bag arrangement (also referred to as airbag module) is known for example from WO 2011/157631, whose inflatable element is provided for covering a vent opening in a gas bag and by releasable connections, preferably in the form of tear seams, is attached to the edge regions of the gas bag surrounding the vent opening. After destruction of the tear seams, parts of the inflatable element clear the vent opening or close the same, and thus in the case of a crash adapt the restraint of the gas bag to certain sensed constraints (vehicle speed, occupant characteristics, seating position, etc.). Independent of the design, the size of the inflatable element must be matched with the size of the associated vent opening. Adapted to various conditions of use, such as vehicle type, kind of airbag module (driver, passenger, side airbag module, etc.), size of the gas bag or characteristic of the gas generator, the vent openings have different shapes and sizes. This means that the dimensioning (blanks, seam contours, fillable volume) of the inflatable elements also is changed correspondingly. Especially the design of the releasable connections (tear seams) requires a high development effort, since the initiated, desired release should be effected safely and quickly in a broad temperature range, so that in the case of a crash the restraint of the gas bag can be adapted to the above-mentioned constraints in good time.

SUMMARY

It is a problem underlying the invention to create a device for controlling the outlet cross-section of a vent opening in a gas bag with an inflatable element as part to be controlled, which can be employed universally largely independent of the design of the gas bag arrangement.

This problem is solved by providing a gas bag arrangement with the features as described herein.

Accordingly, the covering part is connected with the envelope of the gas bag by means of at least one fixed connection and at least one releasable connection, and the inflatable element is formed as a part different (separate) from the covering part, which via the releasable connection likewise is connected with the envelope of the gas bag.

The releasable connection, the covering part and the inflatable element can be formed such that the releasable connection is released when the inflatable element is inflated by means of the additional gas source. The releasable connection for example can be a tear seam. By releasing the releasable connection, the covering part can be lifted from the vent opening or can be pushed through the vent opening by maintaining its fixed connection with the envelope of the gas bag. Lifting the covering part from the vent opening or pushing the same through the vent opening can be effected by means of gas flowing out of the gas bag.

Such gas bag arrangement includes several possibilities for arranging the covering part, the inflatable element and the envelope of the gas bag. For example, the covering part can be arranged between the inflatable element and the envelope of the gas bag. The covering part and the inflatable element can be arranged in the gas bag interior or on the outside of the gas bag. It is furthermore possible that the inflatable element is arranged between the covering part and the envelope (also to be referred to as wall).

Furthermore, the inflatable element can be arranged in the gas bag interior, while the covering part can be arranged outside the gas bag on its envelope. The inflatable element likewise can be arranged outside the gas bag, while the covering part is arranged in the interior of the gas bag.

Furthermore, it can be provided that between the covering part and the inflatable element a cover is arranged. The cover can be made of a fabric material or another type of material with comparable properties.

The inflatable element can extend beside a vent opening. It can be arranged such that it substantially extends on one side of a vent opening.

Furthermore, the inflatable element can at least partly surround the vent opening. In doing so, it can follow the shape of the vent opening. The inflatable element can rest against a circular arc of the vent opening and/or be formed U-shaped. The inflatable element also can completely enclose the vent opening.

The gas bag arrangement can comprise one vent opening, two vent openings or several vent openings.

In a gas bag arrangement with several vent openings, the same can be covered by a common covering part. The vent openings can, however, also be covered by one covering part each.

In the gas bag arrangement, the inflatable element can extend between two vent openings.

The inflatable element of the gas bag arrangement can be connected with several covering parts via at least one releasable connection. Inflating the inflatable element can detach the releasable connection with the envelope of the gas bag from several covering parts. Several covering parts can be connected with the envelope of the gas bag via the same releasable connection or via one releasable connection each.

As described, the gas bag arrangement can comprise several vent openings and several covering parts. It can, however, also be provided that the gas bag arrangement comprises exactly one vent opening and exactly one covering part. Furthermore, the gas bag arrangement can comprise several vent openings and exactly one covering part or exactly one vent opening and several covering parts.

If the gas bag arrangement has exactly one vent opening and exactly one covering part, the vent opening and the covering part can both be arranged on the same side beside the inflatable element.

According to one embodiment, the inflatable element in a condition folded once or several times is connected with the envelope of the gas bag. The connection can be made by a releasable connection which extends through the layers of folds.

Before activation of the actuating mechanism, a covering part can be folded at least in a partial region. It can be folded once or several times to obtain a zigzag shape.

In one embodiment of the gas bag arrangement, the fixed connection of the covering part/of the covering parts with the envelope of the gas bag includes two legs which protrude from a common base. Such form of connection for example substantially can be a U-shape. The two legs of the U-shape can extend in parallel or also protrude from each other at an angle or point towards each other. Furthermore, the legs can also be bent. In addition, instead of being connected by a bent portion the two legs also can be connected by a straight portion. Instead of a U-shape, a V-shape or a section of a circle or oval also is conceivable.

The covering part can be connected with the envelope of the gas bag from outside by means of at least one fixed connection. This at least one fixed connection can entirely surround the vent opening. The at least one fixed connection can at least partly extend in the edge region of the covering part.

The contour of the at least one fixed connection, which entirely surrounds the vent opening, can be crossed by a releasable connection.

It can be provided that gas which flows out of the gas bag through the vent opening flows out of the gas bag arrangement, for example into the interior space of the vehicle or to the ambient air. It can, however, also be provided that the gas flows out of the gas bag into a chamber. Such chamber can be closed to the outside and be formed by the covering part with the envelope of the gas bag and the closed contour of the at least one fixed connection.

The gas bag arrangement can comprise a valve mechanism. The same can be associated to one vent opening or to several vent openings.

Opening and closing of the valve mechanism—wholly or in part—can be actuated in dependence on the filling of the chamber.

Furthermore, the covering part at least partly can include more than one layer. The several layers for example can be formed by at least one convolution of a material blank or by several material blanks. The several layers can be connected with each other.

One or more vent openings can be provided in the envelope of the gas bag.

It can be provided that gas can flow out from the gas bag interior through the vent opening(s) into a chamber. Such chamber can be mounted on the outside of the envelope of the gas bag.

During inflation, the actuating mechanism can interact with the covering part such that the same effects a change in the outlet cross-section of the vent opening to the effect that the vent opening is opened. This means that a change in the outlet cross-section includes both that the outlet cross-section is increased or reduced and that a closed vent opening is at least partly opened or an open vent opening is closed.

BRIEF DESCRIPTION OF THE DRAWINGS

Various embodiments of the invention will be represented below by means of Figures.

FIG. 1 shows a section through an airbag module (gas bag arrangement) in the plane E1 corresponding to FIG. 2.

FIG. 2 shows an interior view of a partial region of the gas bag of FIG. 1 in the region of a device for controlling the outlet cross-section of a vent opening.

FIG. 6 shows the interior view of a partial region of the gas bag in the region of a device for controlling the outlet cross-section of a vent opening.

FIG. 7 shows a section through a device for controlling the outlet cross-section in the plane E4 corresponding to FIG. 6.

FIG. 8 shows a section through a device for controlling the outlet cross-section in the plane E5 corresponding to FIG. 6.

FIG. 9 shows a section through a device for controlling the outlet cross-section in the plane E5 corresponding to FIG. 6 with an alternative design of the inflatable element.

FIG. 10 shows a device for controlling the outlet cross-section of FIG. 6 corresponding to the section according to FIG. 8 after clearing the vent openings of the gas bag.

FIG. 22 shows a modification of the gas bag arrangement of FIGS. 19 and 20.

FIG. 23 shows the gas bag arrangement according to FIG. 22 from the perspective of the front-seat passenger.

DETAILED DESCRIPTION

Figure 3:
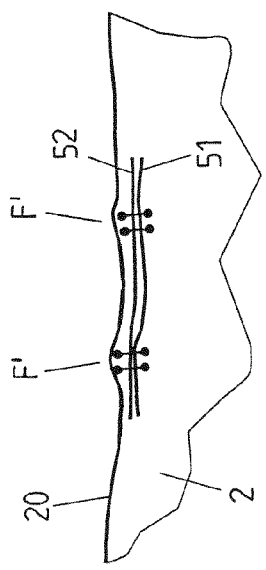
FIG. 3 shows a section through a device for controlling the outlet cross-section in the plane E2 corresponding to FIG. 2.

As essential components of an airbag module, FIG. 1 shows a schematic representation of a gas generator 1 for inflating a gas bag 2 which before inflation is stowed in a module housing 3 (in a folded or gathered condition). The airbag module is shown in FIG. 1 in a condition in which the gas bag 2 already is at least partly filled with gas from the gas generator 1 and therefore has exited from the module housing 3.

The gas generator 1, which in a known manner comprises a housing, is filled with a cold gas and/or chemical substances for generating a hot gas and is provided with outlet openings through which gas can exit from the interior of the gas generator 1, in order to fill the gas bag 2 with gas, so that its envelope 20 unfolds and the gas bag 2 expands out of the module housing 3 to protect a vehicle occupant.

The gas generator 1 here protrudes in the usual way through a so-called blow-in opening or blow-in orifice of the gas bag 2 into its interior, so that gases exiting from the outlet openings of the gas generator 1 can directly get into the interior of the gas bag 2.

For fixing the gas bag 2 at or in the module housing 3, there are used retaining means in the form of a retaining ring 32 which annularly surrounds the gas generator 1 (pot-shaped in the exemplary embodiment) and clampingly fixes the gas bag envelope 20 in the region of the blow-in orifice, namely along the edge of the blow-in orifice, by clamping the gas bag envelope 20 between that retaining ring 32 and a bottom 30 of the module housing 3 along the edge of the blow-in orifice of the gas bag 2. The elements for fixing the retaining means at the module housing 3, which at the same time also can serve for generating the clamping force, are not shown here. For example, this can be screw, rivet or latching elements which can also be provided for fixing the gas generator 1 at the module housing 3.

For accommodating the gas generator 1 as well as the gas bag 2 before inflation, the module housing 3 includes the above-mentioned bottom and in addition a lateral (circumferential) boundary wall protruding therefrom.

In a region which during inflation of the gas bag 2 gets outside the module housing 3, the gas bag 2 is provided with a vent opening 22 in its envelope 20, through which gas can exit from the interior of the gas bag 2 into the environment. In the condition of the airbag module with (partly) inflated gas bag 2 as shown in FIG. 1, the vent opening 22 still is closed by a covering part 7, which in the exemplary embodiment is formed by a one-part flexible fabric portion. For this purpose, the covering part 7 is fixed at its envelope 20 via a fixed connection F, e.g. in the form of at least one seam, along a partial region of its edge, e.g. along the edge of the vent opening 22 of the gas bag 2. Along a second partial region of its edge, the covering part 7 is fixed at its envelope 20 via a releasable connection L, e.g. in the form of at least one tear seam, likewise along the edge of the vent opening 22 of the gas bag 2. The fixed connection F and the releasable connection L jointly enclose the vent opening 22 at least approximately completely.

Apart from the covering part 7, an inflatable element 5 also is fixed at the envelope 20 of the gas bag 2 by the releasable connection L, wherein here the covering part 7 is arranged between the envelope 20 and the inflatable element 5, i.e. the covering part 7 is at least partly covered by the inflatable element 5.

The inflatable element 5 is arranged in the interior of the gas bag 2 and includes an envelope 51, 52 (e.g. made of fabric), which can be filled with gas from a (e.g. pyrotechnical) gas source 6. The inflatable element 5 extends from the gas source 6 (in the manner of a gas duct) in direction of the vent opening 22 without covering the same either in the starting condition or in the filled condition, i.e. the inflatable element 5 extends adjacent to the vent opening 22 (beside the same). This will be explained in more detail in connection with FIG. 2. At an end portion of the inflatable element 5 facing away from the vent opening 22 the same is connected to the gas source 6 such that gas released by the gas source 6 gets into the inflatable element 5.

In the exemplary embodiment, the gas source 6 is connected with the module housing 3 (via non-illustrated fastening means), and here is arranged outside the module housing 3, e.g. below the housing bottom. Via a connection cable 61 it is connected with a controller which, for example controlled by sensors, can ignite a pyrotechnical charge of the gas source 6 via the connection cable 61, so that said gas source releases gas for filling the inflatable element 5.

For fixing the inflatable element 5 (within the module housing 3) such that the same can be filled with gas from the gas source 6 via its one end portion, a fastening element 31 is used, which is arranged within the inflatable element 5 and is designed step-like such that a first region of the fastening element 31 is located inside the inflatable element 5, while a second, stepped region reaches through an opening of the inflatable element 5 and is fixed at the retaining ring 32.

A fixation of the fastening element 31 at the retaining ring 32, so that in the end the inflatable element 5 also is attached thereto, for example can be effected in a positive manner, in particular by latching. For this purpose, the fastening element 31 can be designed as a clip to be snapped (with its second region) into the associated opening of the retaining ring 32.

With its second region protruding from the inflatable element 5 and reaching through the retaining ring 32 and in addition the gas bag 2 in the surroundings of its blow-in orifice, the fastening element 31 extends up to the gas source 6 and is provided with a through opening through which gas released from the gas source 6 can get into the interior of the inflatable element 5.

In addition to the fastening element 31, which at the same time serves for introducing gas, further fastening means also can be provided for fixing the inflatable element 5 at the retaining ring 32 and/or at the module housing 3, e.g. rivets.

FIG. 2 shows an interior view of the gas bag 2 of FIG. 1 in the region of the inflatable element 5, by means of which in particular the design of the inflatable element 5 and its connection with the covering part 7 and the envelope 20 of the gas bag 2 will be explained.

The inflatable element 5 or its envelope 51, 52 here is formed by a one-part blank, e.g. of a fabric material, i.e. in particular a material which can also be used for manufacturing the envelope 20 of the gas bag 2. The blank is folded over once along a line of symmetry or a folding line K and the two layers 51, 52 of the blank lying one on top of the other are firmly connected with each other along their lateral edge regions for forming a duct-shaped inflatable element 5 (gas duct) closed at one end. The fixed connection F' for example can be effected by sewing, gluing or welding. A connection to the envelope 20 of the gas bag 2 preferably does not exist at these points.

At the gas-source-side end portion, the inflatable element 5 (the gas duct) has an opening through which a stepped region of the fastening element 31 arranged therein extends, as has been described already with reference to FIG. 1. In the mounted condition, the inflatable element 5 or the gas duct defines a closed volume (closed fillable chamber), which can be filled with a gas released from the gas source 6, which is introduced by the fastening element 31.

At its end portion facing the vent opening, the inflatable element/the gas duct 5 bifurcates in a U-shaped manner, wherein the two legs and the region connecting the same partly enclose the vent opening 22 along its edge (enclosed region approximately 270°). The releasable connection L between the inflatable element 5 (or the covering part 7) and the envelope 20 of the gas bag 2 here extends along the U-shaped end portion of the inflatable element/gas duct 5, namely through parts of the envelope 51, 52 which later on (upon ignition of the gas source 6) limit its volume filled by the gas source 6. The connection is made such that the vent opening 22 is not covered by the inflatable element/gas duct 5.

The fixed connection F between the covering part 7 and the envelope 20 of the gas bag 2 extends between the upper ends of the two legs of the U-shaped end portion of the inflatable element/gas duct 5. The fixed connection F and the releasable connection L completely surround the vent opening 22 in the exemplary embodiment.

The shown design of the U-shaped end portion merely is to be understood by way of example. Blank and connection with the envelope 20 of the gas bag 2 also can be designed such that the ends of the two legs are arranged at a distance to the fixed connection F between covering part 7 and gas bag 2, which also enables enclosing the vent opening 22 by less than 180°. In this way, the fillable volume of the inflatable element 5 can be adapted to different sizes of the vent opening 22.

The section shown in FIG. 3 extends between the gas-source-side and the vent-opening-side end portion of the inflatable element 5, in the plane E2 of FIG. 2. In this respect, reference on the one hand is made to the explanations of FIG. 2. There is furthermore shown the gas duct (i.e. the inflatable element 5) consisting of two layers 51, 52 (more than two layers also are possible) as well as the connection of the layers by means of fixed seams (fixed connections F'). For more detailed explanations reference is made to the descriptions of FIGS. 1 and 2.

Figure 4:
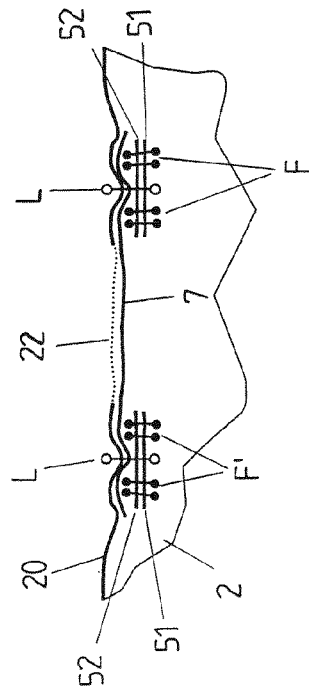
FIG. 4 shows a section through a device for controlling the outlet cross-section in the plane E3 corresponding to FIG. 2.

In the region of the covering part 7 of the inflatable element 5, the section shown in FIG. 4 extends through the vent opening 22 in the region of the two legs of the U-shaped end portion of the gas duct (i.e. of the inflatable element 5) in the plane E3 of FIG. 2. There are shown the fixed connections F' between the layers 51, 52, which define the closed fillable chamber of the inflatable element 5, as well as the fixation of the inflatable element 5 and the covering part 7 at the envelope 20 of the gas bag 2 by means of releasable connections L. What can furthermore be seen is the positioning of the releasable or fixed connections L, F' and of the covering part 7 or the U-shaped end portion with respect to the vent opening 22 in the envelope 20 of the gas bag 2. In this respect, reference also is made to the explanations of FIG. 2.

Figure 5:
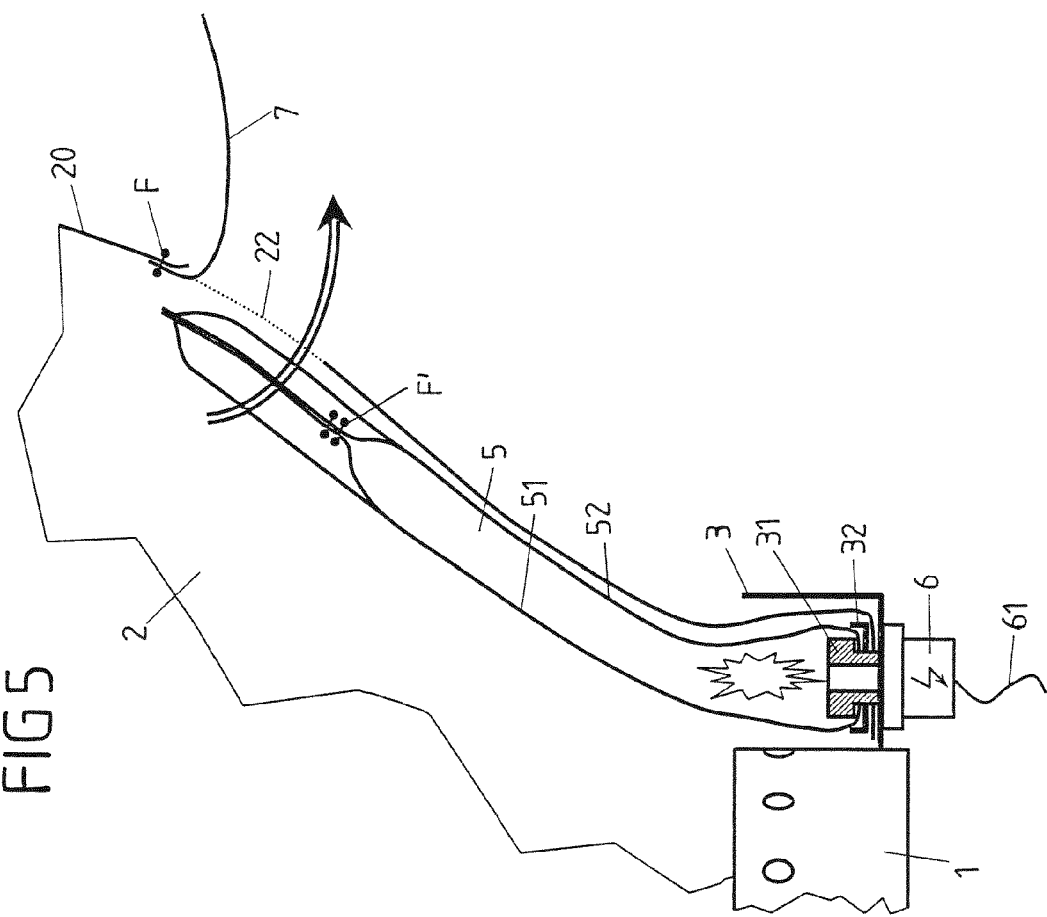
FIG. 5 shows the airbag module of FIG. 1 after clearing a vent opening of the gas bag.

FIG. 5 shows the airbag module of FIG. 1 after igniting the gas source 6 associated to the inflatable element 5, so that the former was filled with gas. Due to the pressure and possibly the temperature of the gases introduced into the inflatable element 5, the releasable connections L between the inflatable element 5 and the envelope 20 of the gas bag 2 are destroyed. At these points, the connection between the covering part 7 and the envelope 20 of the gas bag 2 also is eliminated at the same time. The fixed connection F between gas bag envelope 20 and covering part 7 on the other hand is maintained. Due to the internal pressure existing in the gas bag 2, the covering part 7 therefore can be pushed through the vent opening (with the fixed connection F as articulation region for a swivel movement), so that the same no longer is closed. The gases hence exit from the interior of the gas bag 2 through the vent opening 22 and the internal pressure in the gas bag 2 is reduced—as desired on activation of the gas source 6.

The gas source 6 and the inflatable element 5 thus form an actuating mechanism for actuating the covering part 7.

In connection with the following FIGS. 6 to 10, a second embodiment of the gas bag arrangement is described. Fundamental explanations in the description of FIGS. 1 to 5 also can be transferred to this second embodiment. This includes explanations on the construction of a gas bag arrangement, on the connection of the individual components, on the mode of operation of a gas bag arrangement, and on the construction and actuation of the actuating device (the actuating mechanism).

With the embodiment of FIGS. 6 to 10 there is created a device for controlling the outlet cross-section of one/several vent opening(s) which largely can do without modifications of the inflatable element 5, in case the sizes of the outlet cross-section of the vent opening(s) should change in dependence on the conditions of use of the gas bag arrangement (the airbag module). The inflatable element 5 is present in a standardized design (constant volume, identical seam contours and seam types) for a variety of different outlet cross-sections. A further advantage of this design consists in that comparatively large outlet cross-sections can be controlled therewith, as an inflatable element 5 (an actuating device) actuates the covering parts of several vent openings.

This second embodiment includes two vent openings 22a, 22b which each are closed by a covering part 7a, 7b. The vent openings 22a, 22b here are designed substantially rectangular, wherein the shape however is of minor importance in this connection. For example, the vent openings 22a, 22b also can be present in the form of two semicircular openings. In the mounted condition of the device for controlling the outlet cross-section of the vent openings 22a, 22b, the covering parts 7a, 7b overlap in a middle region (overlap region U) and jointly are covered by a cover 8. The latter includes two openings 81a, 81b which each are arranged congruent with one of the vent openings 22a, 22b. In the representation of FIG. 6, the longitudinally extending overlap region U extends in vertical direction.

The covering parts 7a, 7b and the cover 8 jointly are fixed at the envelope 20 of the gas bag 2 by means of a fixed connection F (preferably in the form of a continuous seam or a seam consisting of several portions). The seam extends along the complete edge of the cover 8, wherein the edges of the covering parts 7a, 7b arranged between the cover 8 and the gas bag envelope 20 however are seized only in part. In the present case, the covering parts 7a, 7b are fixed at the gas bag envelope 20 only in those regions of their edge which are farthest away from the overlap region U. In the representation of FIG. 6 this is effected by the vertically extending portions of the fixed seam F.

Between the vent openings 22a, 22b the inflatable element 5 is arranged, which completely covers the cover 8 in vertical direction (see FIG. 6). In this embodiment, too, the inflatable element 5 extends from the gas source 6 (in the manner of a gas duct) in direction of the vent openings 22a, 22b without covering the same (neither in the starting condition nor in the filled condition); i.e. the inflatable element 5 extends adjacent to the vent openings 22a, 22b (beside the same). Via a releasable connection L (preferably in the form of a tear seam), the inflatable element 5 is fixed at the envelope 20 of the gas bag 2. By means of this tear seam, the covering parts 7a, 7b and the cover 8 are fixed at the envelope 20 of the gas bag 2, wherein in the mounted condition the covering parts 7a, 7b and the cover 8 are arranged between the envelope 20 of the gas bag 20 and the inflatable element 5 (see FIGS. 7, 8). The releasable connection L extends in direction of the longitudinally extending overlap region U of the covering parts 7a, 7b (in FIG. 6 in vertical direction) approximately centrally in the same. The length of the releasable connection L approximately corresponds to the length of the overlap region U.

FIG. 9 shows the inflatable element 5 of the second embodiment. The same is present here in folded form, namely such that a zigzag-shaped cross-section is obtained transversely to its direction of extension. The releasable connection L (tear seam), by means of which the inflatable element 5 is fixed at the envelope 20 of the gas bag 2, in this modification also fixes its fold structure. By folding the inflatable element 5, the volume which must be filled by the gas source 6 for releasing the releasable connections L is reduced. The internal pressure necessary for releasing can build up more quickly, which ultimately leads to faster clearing of the outlet cross-sections and thus to a faster reaction to certain crash parameters. A more detailed explanation of the mode of operation of the second embodiment will be given below in connection with FIG. 10.

The zigzag-shaped cross-section is to be understood merely by way of example. Any other convolution which leads to a reduction of the fillable volume also is conceivable. This also includes those convolutions in which the cross-section of the inflatable element 5 changes in its direction of extension. Folded inflatable elements 5 also are applicable in the embodiments described below.

FIG. 10 shows the device for controlling the outlet cross-section from FIG. 6 after ignition of the gas source 6 associated to the inflatable element 5, so that the former was filled with gas. Due to the pressure and possibly the temperature of the gases introduced into the inflatable element 5, the releasable connection L between the inflatable element 5 and the envelope 20 of the gas bag 2 is destroyed. At these points, the connection between the cover 8, the covering parts 7a, 7b and the envelope 20 of the gas bag 2 also is eliminated at the same time. The fixed connection F between gas bag envelope 20 and the covering parts 7 on the other hand is maintained. Due to the internal pressure existing in the gas bag 2, the covering parts 7a, 7b therefore can be pushed through the associated vent openings 22a, 22b (with the respective fixed connection F as articulation region for a swivel movement), so that the same no longer are closed. The gases hence exit from the interior of the gas bag 2 through the vent openings 22a, 22b and the internal pressure in the gas bag 2 is reduced—as desired on activation of the gas source 6.

The gas source 6 and the inflatable element 5 thus form an actuating mechanism for actuating the two covering parts 7a, 7b.

It should be noted that with a corresponding design the described embodiment also is applicable for only one covering part 7. The vent openings 22a, 22b (or the vent opening 22) then merely are located on one side of the inflatable element 5 and are not arranged symmetrically to the same. It is also possible to omit a cover 8 and merely arrange the covering parts 7a, 7b between the inflatable element 5 and the gas bag envelope 20.

The two above-described embodiments of a device for controlling the outlet cross-section of vent openings 22, 22a, 22b have been explained in connection with an arrangement in the gas bag interior. The device can, however, also be arranged on the outside of the gas bag envelope 20.

In the following, a third embodiment will be described. This embodiment represents a modification of the second embodiment, wherein here as well reference is made to the fundamental facts (construction of a gas bag arrangement, connection of the individual components, mode of operation of a gas bag arrangement, and construction and actuation of the actuating device) explained in connection with the previous Figures.

Figure 11:
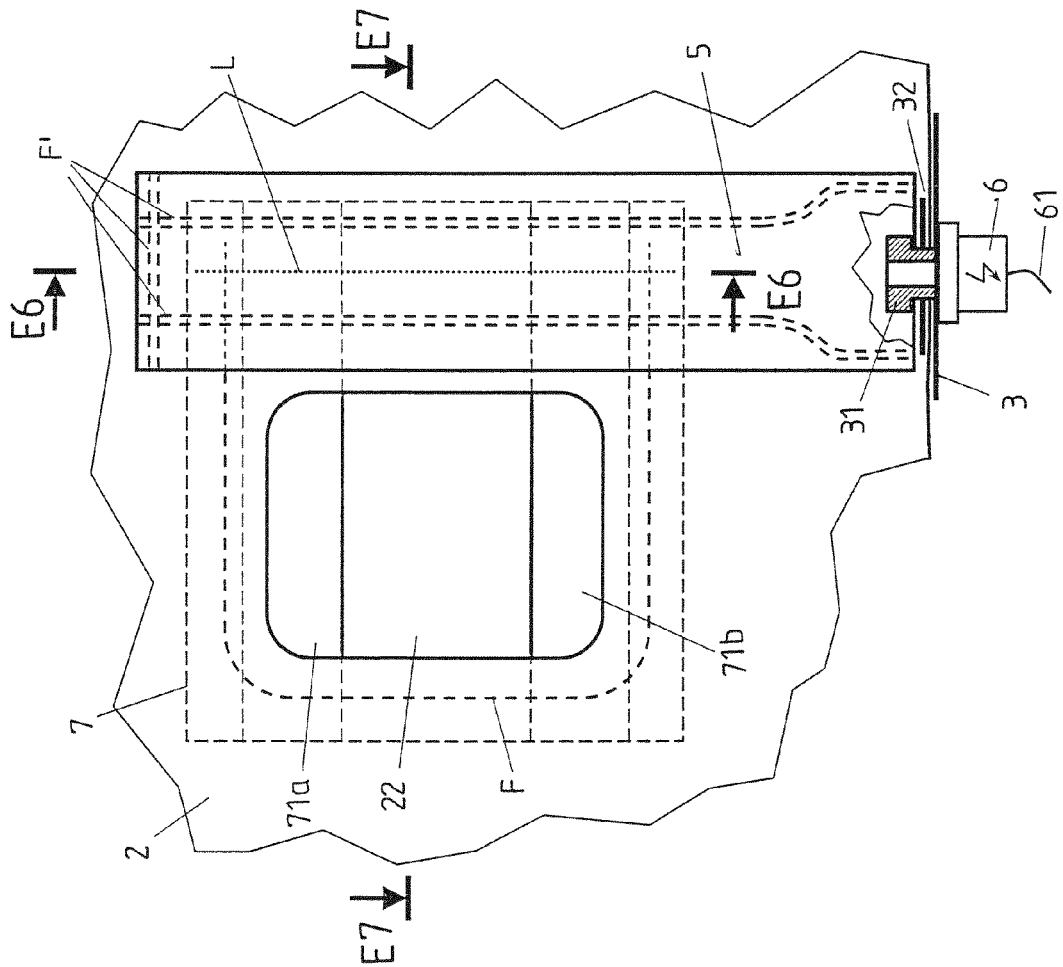
FIG. 11 shows the interior view of a partial region of the gas bag in the region of a device for controlling the outlet cross-section of a vent opening.

In the third embodiment, the gas bag arrangement merely comprises a vent opening 22 and a covering part 7, which both are arranged on one side beside the inflatable element 5, as shown in FIG. 11, wherein here as well the shape of the vent opening 22 is of minor importance. A further difference consists in that the inflatable element 5 is arranged in the gas bag interior, while the covering part 7 is fixed at the envelope 20 outside the gas bag 2.

Before the activation of the actuating mechanism, the vent opening 22 is closed by a covering part 7 which is fixed at the outside of the envelope 20 of the gas bag 2. For this purpose, the covering part 7 is fixed at the envelope 20 via a fixed connection F, e.g. in the form of a seam, along a partial region of its edge, e.g. along the edge of the vent opening 22 of the gas bag 2. The fixed connection F surrounds the vent opening 22 substantially in a U-shape. The U-shape is closed by a releasable connection L (e.g. tear seam) between covering part 7 and envelope 20 of the gas bag 2, which connects (crosses) the outer ends of the legs of the U-shape. The closed connection largely prevents the inadvertent exit of the gases present in the gas bag 2, when the actuating mechanism has not been activated.

The covering part 7 is formed by a one-part flexible fabric blank which is folded in a zigzag-shaped manner on two opposed regions 71a, 71b and only subsequently is fixed at the envelope 20 of the gas bag 2 (see FIGS. 12, 13). Fixing is effected such that the folded regions 71a, 71b extend along the legs of the U-shape (in particular extend parallel to the same), as can be seen in FIG. 11. Fixing the fold layer of the folded regions 71a, 71b at their first ends is effected by the portion of the U-shaped fixed connection F which connects the legs of the U-shape with each other. At second ends, fixing the fold layer of the folded regions 71a, 71b to the covering part 7 is effected by the releasable connection L connecting the legs of the U-shape. The legs of the U-shape itself do not serve the fixation of the fold layer.

As described, folding of the covering part 7 is effected before its fixation preferably at two opposed regions 71a, 71b of the edge. It is, however, also possible that folding is effected on one side only, at only one edge region. Likewise, the folded regions 71a, 71b also can extend at an angle to the legs of the U-shape and not in parallel.

Figure 14:
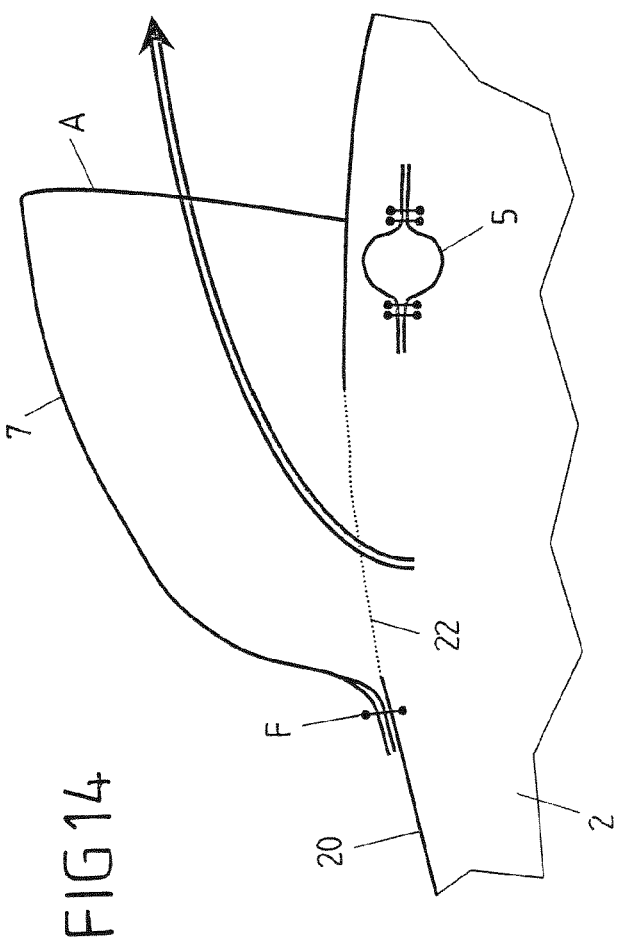
FIG. 14 shows a device for controlling the outlet cross-section of FIG. 11 corresponding to the section according to FIG. 13 after clearing the vent openings of the gas bag.
Figure 15:
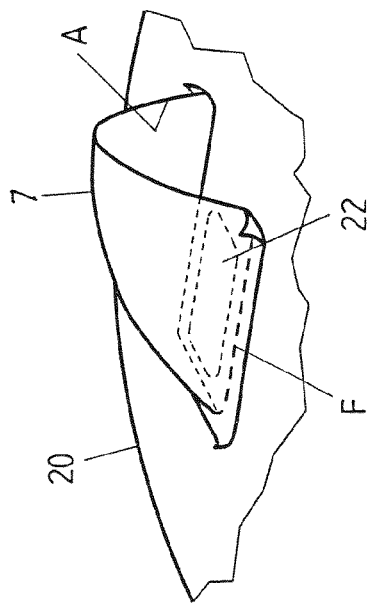
FIG. 15 shows a device for controlling the outlet cross-section corresponding to FIG. 14 in a perspective representation.

FIGS. 14 and 15 show the device for controlling the outlet cross-section from FIG. 11 after ignition of the gas source 6 associated to the inflatable element 5, so that the former was filled with gas. Due to the pressure and possibly the temperature of the gases introduced into the inflatable element 5, the releasable connection L between the inflatable element 5 and the envelope 20 of the gas bag 2 is destroyed. Associated with this, the releasable connection L between the covering part 7 and the envelope 20 of the gas bag 2 also is eliminated, wherein at the same time the fixation of the fold layers of the folded regions 71a, 71b of the covering part 7 at its second ends is released. The fixed connection F (here in U-shape) between the gas bag envelope 20 and the covering part 7 on the other hand is maintained.

Due to the internal pressure existing in the gas bag 2, the covering part 7 can partly be lifted from the envelope 20 of the gas bag 2, so that the vent opening 22 no longer is closed. The gases hence exit from the interior of the gas bag 2 through the vent opening 22, and the internal pressure in the gas bag 2 is reduced—as desired on activation of the gas source 6.

Due to the U-shape of the fixed connection F between covering part 7 and gas bag envelope 20, and the unilaterally released fixation of the fold layer of its folded regions 71a, 71b, the covering part 7 now bulged to the outside (away from the envelope 20 of the gas bag 2) assumes the shape of a hood, with a defined cross-section for the gases exiting from the gas bag 2. The size of the outlet cross-section A is determined by dimensioning the folds of the folded regions 71a, 71b of the covering part 7. The resulting shape of a hood offers the possibility of directing gases exiting from the gas bag interior into a particular direction, in order to for example prevent a contact with the vehicle occupant(s) as far as possible.

In the following, a fourth embodiment will be described. This embodiment is a modification of the third embodiment, wherein here the longitudinally extending covering part 7, which covers the vent opening 22, has much larger dimensions and by means of a fixed connection F (e.g. in the form of a seam) is fixed at the outside of the envelope 20 of the gas bag 2, which surrounds the vent opening 22 and forms a closed contour. This can be effected both by a continuous connection and by several overlapping connecting portions. In the present case, the fixed connection F extends along the complete edge region of the covering part 7 (see FIG. 16).

The closed contour of the fixed connection F is crossed by a releasable connection L between covering part 7 and envelope 20 of the gas bag 2, which extends adjacent to the vent opening 22 and thus holds the same closed. The releasable connection L here at the same time also serves for fixing the inflatable element 5 of the actuating mechanism in the interior of the gas bag 2.

Figure 13:
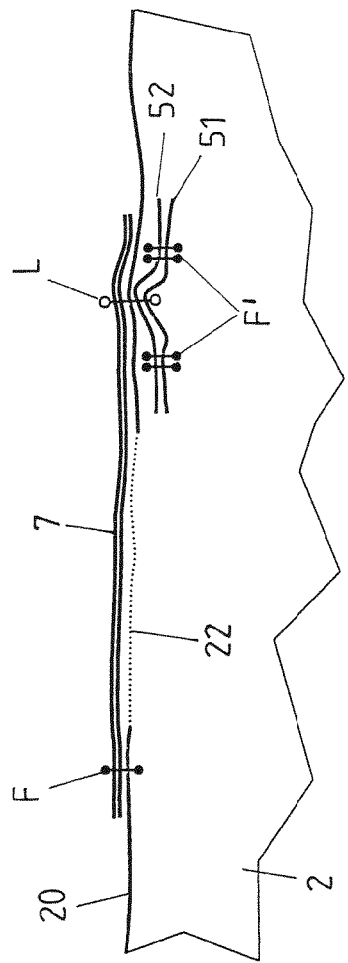
FIG. 13 shows a section through a device for controlling the outlet cross-section in the plane E7 corresponding to FIG. 11.
Figure 12:
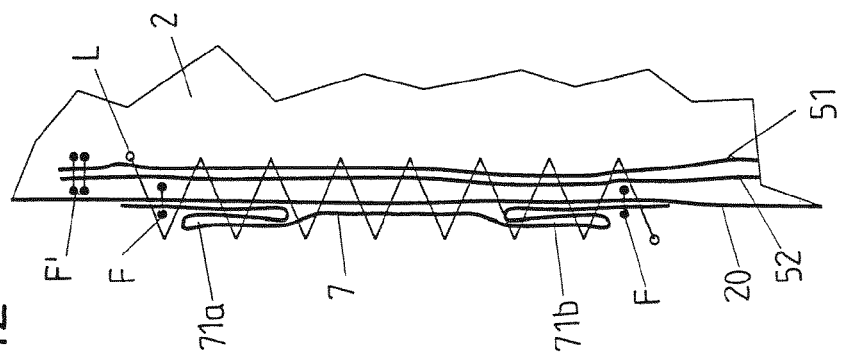
FIG. 12 shows a section through a device for controlling the outlet cross-section in the plane E6 corresponding to FIG. 11.

With regard to the design of the fourth embodiment reference also is made to the sections in FIG. 12 and FIG. 13 (in part) and the description related thereto.

Figure 16:
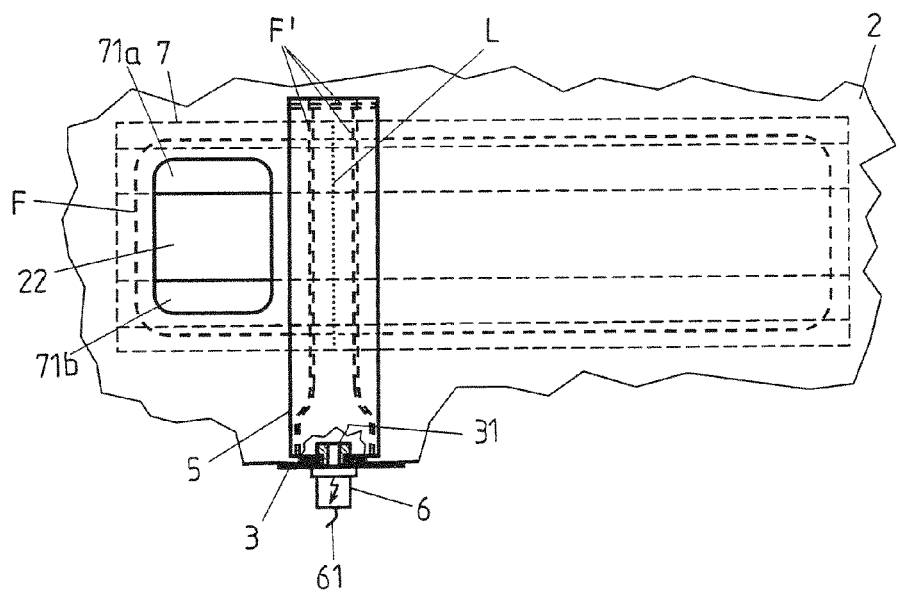
FIG. 16 shows the interior view of a partial region of the gas bag in the region of a device for controlling the outlet cross-section of a vent opening.
Figure 17:
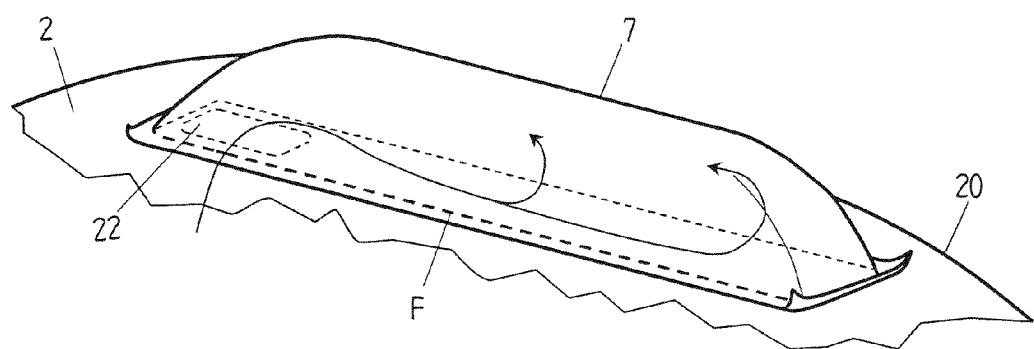
FIG. 17 shows the device for controlling the outlet cross-section of a vent opening with a covering part corresponding to FIG. 16 in a perspective representation after clearing the vent opening.

FIG. 17 shows the device for controlling the outlet cross-section from FIG. 16 after ignition of the gas source associated to the inflatable element 5. The related processes correspond to those described in connection with FIGS. 14 and 15.

Like in the third embodiment, the fixed connection F between the envelope 20 of the gas bag 2 and the covering part 7 is maintained. Due to the closed contour of the fixed connection F, however, the covering part 7 together with the envelope 20 of the gas bag 2 forms a (closed) chamber separate from its interior, into which gases exiting from the interior of the gas bag 2 through the vent opening 22 flow in. From there, the gases do not get into the environment, but remain in the chamber. Under certain circumstances, however, the chamber also can be provided with an additional outflow opening. The same then can be dimensioned such that the gases are released into the environment only with a delay, so that an internal pressure nevertheless can build up in the chamber.

By providing the chamber, there is provided a gas bag 2 with an additional volume which must be filled by the gases released by the gas generator 1. In dependence on the time of the activation of the actuating mechanism for clearing the vent opening 22 (and hence the provision of the chamber), the rise of the pressure in the interior of the gas bag 2 is reduced and the pressure drop after exceedance of a maximum is accelerated. Since the gases cannot leave the chamber, the pressure obtained after filling the same in the further course is decreased only with a delay. This means that the restraining capacity of the filled gas bag 2 also can be maintained over an extended period. Via the dimensioning of the chamber (its volume) and the size of the vent opening 22, the targeted pressure course is preset and hence the gas bag arrangement is adapted to existing constraints (gas quantity delivered by the gas generator 1, size of the gas bag 2, etc.).

Figure 18:
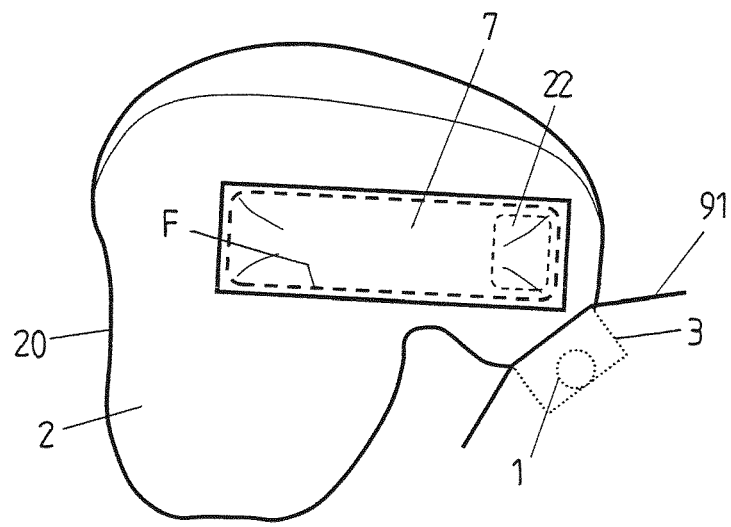
FIG. 18 shows a gas bag arrangement with a device for controlling the outlet cross-section of a vent opening corresponding to FIG. 17 in a side view.

FIG. 18 shows the fourth embodiment of a device for controlling the outlet cross-section of a vent opening 22 on a gas bag arrangement for the passenger side of a motor vehicle in a side view. There is shown the state of the gas bag 2 after filling by the gases released by a gas generator 1. In the initial state, the gas bag arrangement is accommodated below the dashboard 91 of the motor vehicle.

Figure 19:
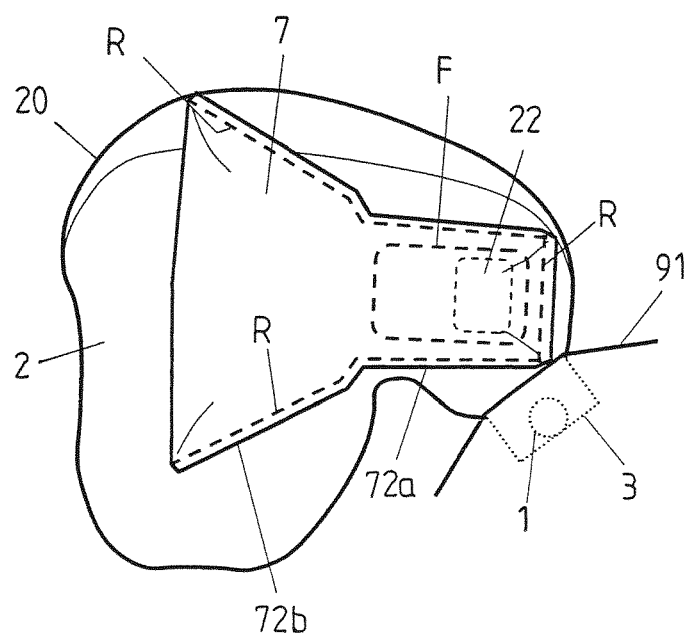
FIG. 19 shows the gas bag arrangement according to FIG. 18 with a modified covering part.

FIG. 19 shows an alternative embodiment for a covering part 7 of the fourth embodiment. In contrast to the embodiment described in connection with FIGS. 16 to 18, the covering part 7 here is of the multilayer (two-layered) type. It is formed by a one-part blank, preferably of a material for manufacturing the envelope 20 of the gas bag 2, which is folded over along a line of symmetry and is firmly connected with each other (sewn) along the edge regions of the layers lying one on top of the other (connection R).

The covering part 7 has a longitudinally extending first narrow portion 72a which subsequently transitions into a second portion 72b widening on both sides. Merely in its first portion 72a, the covering part 7 is fixed at the envelope 20 of the gas bag 2 via the fixed connection F. The consequence is that the second portion 72b of the covering part 7 is pivotable with respect to the first portion 72a in the filled state of the gas bag 2.

It should be noted that the described shape of the covering part 7 merely is to be understood by way of example. It should be indicated that via the shape an adaptation of the gas bag arrangement (of the deployed gas bag 2) to the spatial environment in the vehicle interior space also can be effected. The covering part 7 for example can have an identical cross-section over its complete length (first and second portion 72a, 72b) or also widen on one side only. For manufacturing the covering part 7, fabric layers deviating from congruent shapes also can be used.

In the filled state not yet acted upon by the vehicle occupant, gas bag 2 and covering part 7 (chamber) likewise can support (be in contact with each other) on parts of the vehicle interior space (dashboard, side structure of the motor vehicle).

Figure 20:
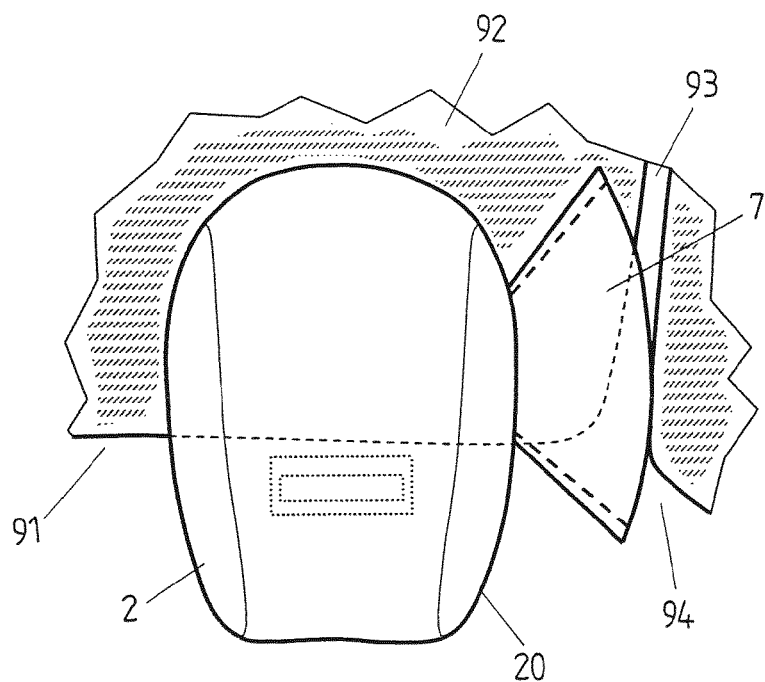
FIG. 20 shows the gas bag arrangement according to FIG. 19 from the perspective of the occupant.

FIG. 20 shows the gas bag arrangement of FIG. 19 from the perspective of the front-seat passenger. The covering part 7 (the chamber) is arranged on the right and covers parts of the A-pillar 93 or the side structure 94 of the motor vehicle extending beside the windshield 92. This protects the occupant from injuries when in the case of an oblique impact the occupant for example slides off from the gas bag 2 and with his head for example moves in direction of the A-pillar 93.

Figure 21:
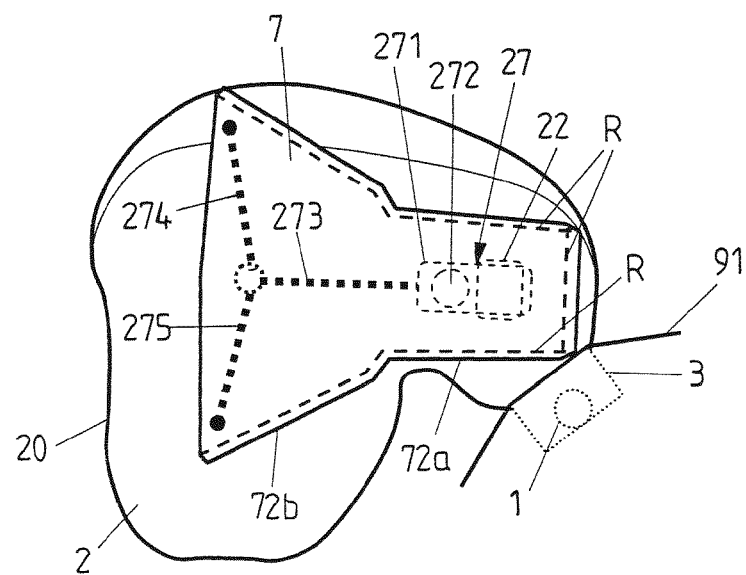
FIG. 21 shows the gas bag arrangement according to FIG. 19 with a further modification of the covering part.

FIG. 21 shows the gas bag arrangement of FIG. 19 with a further modification of the covering part 7. The fixed connection F between the envelope 20 of the gas bag 2 and the covering part 7 was not shown here for reasons of clarity.

In the present case, a valve mechanism 27 is associated to the vent opening 22. Said valve mechanism comprises a valve element 271 movable relative to the vent opening 22 with a valve opening 272 and several associated straps 273, 274, 275, wherein at least one strap is connected with the valve element 271. In the present case, a first strap 273 extends from the valve element 271 in direction of the second portion 72b of the covering part 7. With the end of the first strap 273 a second and a third strap 274, 275 are connected, which with their other end each are fixed at outer regions of the second portion 72*b*.

In the starting condition up to directly after activation of the actuating mechanism (covering part/chamber 7 are not fully unfolded yet) the valve mechanism is in a position in which the vent opening 22 is not closed. The valve opening 272 is congruent to the vent opening 22, so that a transfer of the gases from the gas bag 2 into the chamber is effected. In the further course of filling the covering part 7 (the chamber) the same unfolds and via the straps 273, 274, 275 introduces a force into the valve element 271 (by tensioning the straps). Said valve element thereby is moved out of its position, wherein valve and vent opening 272, 22 get out of congruence to each other. The gases present in the chamber are inhibited or largely prevented from flowing back into the gas bag 2.

By the described measure, the internal pressure in the chamber can be maintained longer than that in the interior of the gas bag 2, which further minimizes the risk of injury for the occupant by a contact with the A-pillar 93 in the case of sliding off from the gas bag 2.

In contrast to the embodiment described in connection with FIGS. 19 and 20, the covering part of a (fifth) exemplary embodiment shown in FIGS. 22 and 23 is arranged on the side facing the driver.

FIG. 22 shows a gas bag arrangement with a device for controlling the outlet cross-section of a vent opening 22 corresponding to FIG. 17 in a side view. Like in the embodiment of FIGS. 19 and 20, the covering part 7 is of the multilayer (two-layered) type and is formed by a one-part blank which likewise is folded over along a line of symmetry and is firmly connected with each other along the edge regions of the layers lying one on top of the other. In contrast to the embodiment of FIGS. 19 and 20, the line of symmetry here extends approximately horizontal and the second portion 72*b* adjoining the first portion 72*a* merely widens on one side. Statements made in connection with FIGS. 19 and 20 with regard to pivotability, shape and manufacture also apply for the embodiment of FIG. 22.

FIG. 23 shows the gas bag arrangement of FIG. 22 from the perspective of the front-seat passenger. The covering part 7 (in the form of a chamber) here is arranged on the gas bag 2 to the left as seen in direction of travel and covers regions of the dashboard located between front-seat passenger and driver. In dependence on the impact direction in the case of an oblique impact, both the front-seat passenger and the driver thereby can be protected from injuries, when the same slide off from their associated gas bag. It is also indicated in the drawing that one covering part 7, 7' each (one chamber each) can be arranged on the gas bag 2 to the right and to the left.

Figure 24:
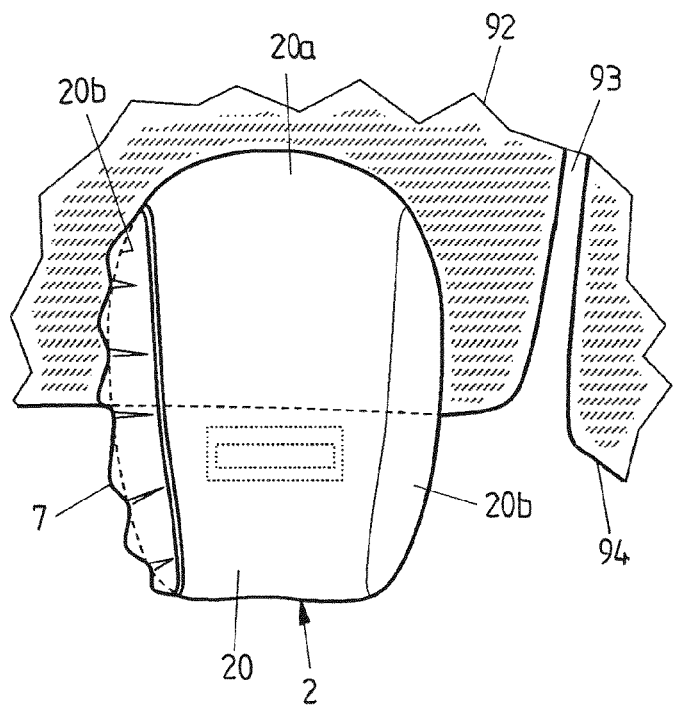
FIG. 24 shows a further embodiment of a covering part for a gas bag arrangement corresponding to FIG. 17.
Figure 25:
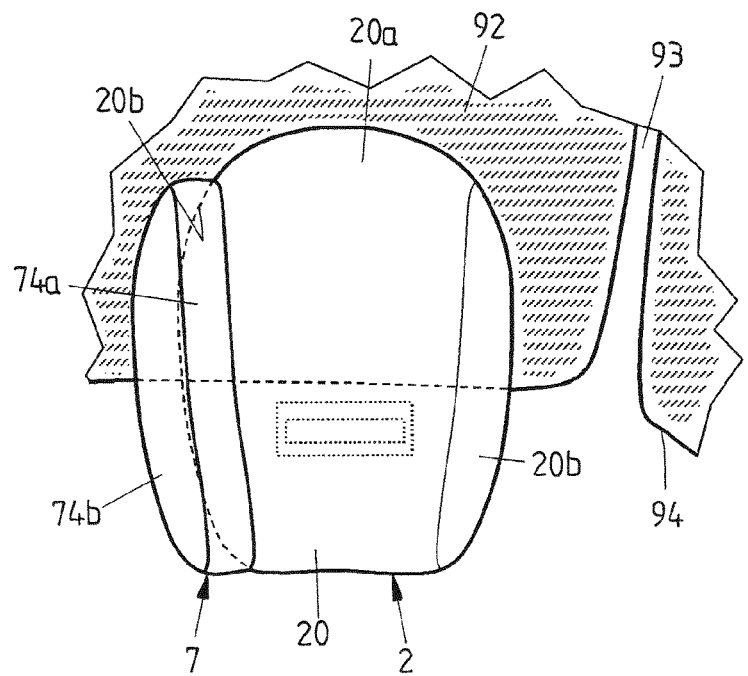
FIG. 25 shows the arrangement of FIG. 24 after activation of the device for controlling the outlet cross-section of a vent opening covered by the covering part.

FIGS. 24 and 25 show a further embodiment of a covering part 7 (in the form of a chamber) for a gas bag arrangement with a device for controlling the outlet cross-section of a vent opening corresponding to FIG. 17. The gas bag 2 consists of several fabric blanks (here three fabric blanks, namely a middle part 20*a* and two side parts 20*b*), which are connected with each other along adjacent edge regions. One fabric blank (here a left side part 20*b*) is covered by the covering part 7, wherein the edge regions of the fabric blank and the covering part 7 jointly are connected with the adjacent (left) edge region of the middle part 20*a*.

FIG. 24 shows the gas bag arrangement with non-activated device for controlling the outlet cross-section of a vent opening; i.e. the chamber formed by the covering part 7 and the gas bag envelope 20 is not filled.

When the device for controlling the outlet cross-section is activated, the vent opening is cleared and the chamber is filled. This state is shown in FIG. 25. The covering part 7 is of the multi-part type. Here, it consists of two fabric blanks, a wall part 74*b* which is designed approximately congruent with the adjacent side part 20*b* and a spacer part 74*a* which bridges the distance between wall part 74*b* and side part 20*b*. The volume of the chamber is defined by the width of the spacer part 74*a*.

The invention claimed is:

1. A gas bag arrangement for a vehicle occupant restraint system, comprising
    a gas bag inflatable by a gas generator to protect a vehicle occupant, whose envelope defines an interior space of the gas bag that can be filled with gas,
    a vent opening through which gas can flow out of the gas bag, and
    a device for controlling the outlet cross-section of the vent opening, which comprises at least one covering part with which the vent opening can be covered, in order to at least partly close the same, and which furthermore comprises an actuating mechanism which interacts with the covering part, in order to vary the outlet cross-section of the vent opening,
    wherein the actuating mechanism includes an additional gas source and an element different from the gas bag and inflatable by means of the gas source, which during inflation interacts with the covering part such that it effects a change in the outlet cross-section of the vent opening, and
    wherein the covering part is connected with the envelope of the gas bag by means of at least one fixed connection and a releasable connection and that the inflatable element is formed as an element different from the covering part which via the releasable connection likewise is connected with the envelope of the gas bag.

2. The gas bag arrangement according to claim 1, wherein the releasable connection, the covering part and the inflatable element are formed such that during inflation of the inflatable element the releasable connection is released and the covering part can be lifted from the vent opening or be pushed through the vent opening by maintaining its fixed connection with the envelope of the gas bag.

3. The gas bag arrangement according to claim 1, wherein the covering part is arranged between the inflatable element and the envelope of the gas bag.

4. The gas bag arrangement according to claim 1, wherein the inflatable element is arranged adjacent to the vent opening.

5. The gas bag arrangement according to claim 1, wherein the gas bag arrangement includes several vent openings.

6. The gas bag arrangement according to claim 5, wherein the vent openings each are covered by a covering part.

7. The gas bag arrangement according to claim 1, wherein via the releasable connection the inflatable element is connected with the envelope of the gas bag, via which the covering part also is connected with the envelope of the gas bag.

8. The gas bag arrangement according to claim 1, wherein inflatable element interacts with at least two covering parts.

9. The gas bag arrangement according to claim 1, wherein the covering part is fixed on the outside of the gas bag by the releasable connection at least one fixed connection such that the at least one fixed connection surrounds the vent opening in a closed contour.

10. The gas bag arrangement according to claim 9, wherein the at least one fixed connection at least partly extends along the edge region of the covering part.

11. The gas bag arrangement according to claim 9, wherein the closed contour of the at least one fixed connection is crossed by the releasable connection.

12. The gas bag arrangement according to claim 9, wherein with the envelope of the gas bag the covering part forms a chamber closed to the outside due to the closed contour of the at least one fixed connection.

13. The gas bag arrangement according to claims 12, wherein a valve mechanism is associated to the vent opening and the valve mechanism can be actuated in dependence on the filling of the chamber.

14. The gas bag arrangement according to claim 1, wherein a valve mechanism is associated to the vent opening.

15. The gas bag arrangement according to claim 1, wherein through the vent opening gas can flow out into a chamber arranged on the outside of the envelope of the gas bag.

16. The gas bag arrangement according to claim 1, wherein during inflation the actuating mechanism interacts with the covering part such that it effects a change in the outlet cross-section of the vent opening to the effect that the vent opening is opened.

\* \* \* \* \*